United States Patent [19]

Lotter et al.

[11] Patent Number: 6,162,442

[45] Date of Patent: *Dec. 19, 2000

[54] USE OF AQUEOUS L-TRYPTOPHAN AND/OR L-THREONINE SALT SOLUTIONS

[75] Inventors: Hermann Lotter, Altenstadt; Karlheinz Drauz, Freigericht, both of Germany

[73] Assignee: Degussa-Huls AG, Frankfurt, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/741,112

[22] Filed: Oct. 30, 1996

[30] Foreign Application Priority Data

Nov. 2, 1995 [DE] Germany ............... 195 40 788

[51] Int. Cl.$^7$ ...................................... A61K 9/44
[52] U.S. Cl. .................... 424/400; 424/438; 424/442
[58] Field of Search .................... 424/400, 438, 424/442; 514/419

[56] References Cited

U.S. PATENT DOCUMENTS

| | | | |
|---|---|---|---|
| 4,436,910 | 3/1984 | Kleemann et al. | 546/245 |
| 4,777,051 | 10/1988 | Nagano et al. | 426/61 |
| 4,778,808 | 10/1988 | Sano et al. | 514/419 |
| 5,279,832 | 1/1994 | Greissinger et al. | 424/438 |
| 5,505,968 | 4/1996 | Schaefer et al. | 424/617 |

FOREIGN PATENT DOCUMENTS

| | | |
|---|---|---|
| 2357119 | 5/1974 | Germany . |
| 3400603 | 7/1985 | Germany . |
| 61-189267 | 8/1986 | Japan . |
| 1475861 | 6/1977 | United Kingdom . |

*Primary Examiner*—S. Mark Clardy
*Assistant Examiner*—Kathryne E. Shelborne
*Attorney, Agent, or Firm*—Pillsbury Madison & Sutro, LLP

[57] ABSTRACT

Highly concentrated aqueous L-Tryptophan and/or L-Threonine salt solutions are used to supplement mixed feeds with L-Tryptophan and/or L-Threonine. They can be metered easily and accurately, can be produced in a highly concentrated form with a content of between 30 and 70% and are storage stable to a surprisingly high degree (slight tendency to crystallize, no chemical decomposition, no racemization) even over a relatively long period of at least three months when outside temperatures are low.

4 Claims, No Drawings

USE OF AQUEOUS L-TRYPTOPHAN AND/OR L-THREONINE SALT SOLUTIONS

The invention relates to the use of aqueous L-Tryptophan and/or L-Threonine salt solutions for supplementing mixed feeds with L-Tryptophan and/or L-Threonine.

Industrially produced mixed feeds are used in particular to feed various useful farm animals such as poultry, pigs and cattle, although they are also used to feed domestic animals. The feed in question should contain all the nutrients required for the respective species in a balanced quantity.

The composition of the mixed feeds may vary according to supply and the price of the constituents. However the recipe must always be worked out so that the nutrient contents meet the specific needs of the animals. Supplements which improve the physiological effectiveness of the rations in terms of nutrition are therefore added to the mixed feed. These include amino acids such as L-Threonine and L-Tryptophan, as well as mineral substances, trace elements and preservatives.

Individual feedstuffs and supplements are initially in the form of individual constituents and must be homogenised in a mixing operation in a suitable mixing plant according to their nature. This requires satisfactory metering and mixing accuracy. In the case of supplements which are only present in a low concentration in the finished mixed feed, it may be necessary to produce a pre-mix with a higher concentration.

In this respect the advantage of using aqueous solutions of the supplements lies in the fact that they can also be accurately metered in small quantities. Moreover, as a liquid formulation, they do not entail the necessity of producing a pre-mix containing the supplement in a higher concentration, which is otherwise often required, when supplementing mixed feeds. They may also be homogeneously mixed in the provided concentration directly with the other constituent of the mixed feed already available in the desired concentration, e.g. by spraying into a mixing chamber.

In addition, the use of aqueous solutions of the supplements usually enables transport from the producer to the consumer and storage with the mixed feed producer to be greatly simplified through the use of silo vehicles and suitable storage tank systems and therefore carried out at a lower cost.

A prerequisite for this is the possibility of producing solutions of the supplements with the highest possible concentrations in order to minimise transport and storage costs. These highly concentrated solutions should also remain storage-proof over a relatively long period and possibly also when the outside temperature is low. This implies only a slight tendency to crystallize, no chemical decomposition and no racemization when using L-amino acids. However, should the supplement crystallize out of the aqueous solution at relatively low temperatures, it should ultimately be possible to re-dissolve it by simply heating the suspension and circulating it through pumping.

It is known from DE-OS 28 50 075, which relates to a method for stabilizing solutions containing tryptophan, that solutions of tryptophan or of amino acid mixtures containing tryptophan tend to change colour within a short period, particularly under the action of light and/or atmospheric oxygen. The addition of small quantities of sodium pyrosulphide (Pharmazie 27 (1972), p. 660–669) or a salt of dithionous acid in a quantity of at least 0.01 g per 100 ml solution is proposed to prevent decomposition. Apart from the fact that the addition of substances of this kind alters the product in such a way that it then requires a licence, additions of the proposed type to feedstuffs do not appear to be absolutely safe.

The described problem regarding the low stability of L-Tryptophan solutions also applies in a similar manner to L-Threonine solutions and has resulted, inter alia, in both L-Tryptophan and L-Threonine solutions so far failing to exhibit the quality required when used as liquid supplements, if the above-mentioned amino acids are actually used for supplementation purposes.

In view of the prior art presented and discussed here, the object of the invention is to find a liquid L-Threonine and L-Tryptophan supplement which is suitable for industrially produced mixed feed, should be storage-proof over a lengthy period, particularly also in the form of highly concentrated solutions, and should also be easy to re-dissolve if the supplement crystallizes at very low temperatures.

This object, as well as others not mentioned in detail, are solved by using storage stable, highly concentrated aqueous L-Tryptophan and/or L-Threonine salt solutions with an L-Tryptophan and/or L-Threonine content of between 30 and 70% by weight to supplement animal feedstuffs and industrially produced mixed feeds with L-Tryptophan and/or L-Threonine.

It has surprisingly been found, within the scope of the invention, that it is also possible to supplement feedstuffs and mixed feeds with highly concentrated aqueous solutions of L-Threonine and L-Tryptophan.

The fact that it was at all possible to produce L-Tryptophan and/or L-Threonine salt solutions in a quantity of between 30 and 70% by weight in an aqueous solution was in this case initially unexpected. The actual amino acids have only a relatively low solubility in water at 20° C. of 8.3% by weight (L-Threonine) and 1.0% by weight (L-Tryptophan). If, however, the amino acids are used in the form of their salts, it is possible to achieve free amino acid contents of 60 to 70% by weight in an aqueous solution at temperatures of approximately 20° C. This was not easily foreseeable, particularly with respect to L-Tryptophan, as in this case the amino acid content of the salt solution may be increased by more than sixty times.

The L-Tryptophan and L-Threonine salts to be used according to the invention include all compounds with which the person skilled in the art is familiar. The alkaline earth metal salts and alkali metal salts are preferred, and among these sodium and potassium salts are in turn particularly preferred. An L-Tryptophan sodium or potassium salt is therefore used in a preferred embodiment of the invention. An L-Threonine sodium or potassium salt is used in a further particularly preferred modification according to the invention.

In spite of the above-mentioned high salt concentration, the aqueous solutions according to the invention have only a slight tendency to crystallize and are highly storage stable. No chemical decomposition (reduction in amino acid content) or racemization could thus be established after storing the solutions at 60° C. for a period of one week. In a particularly advantageous embodiment the use according to the invention is characterised in that the supplementary solutions employed are storage stable for at least three months at temperatures between −20° C. and +5° C. This means that they have an extraordinarily slight tendency to crystallize, so that the highly concentrated, aqueous salt solutions of L-Threonine and L-Tryptophan can be stored without any problems in temperatures ranging from +5° to −20° C. Thus salt solutions with 55% by weight L-Threonine or 50 (sodium salt) and 55 (potassium salt) % by weight L-Tryptophan exhibited no tendency to crystallize, no measurable chemical decomposition or racemization and remained pumpable over a period of three months at +5° C. Solutions with 55% by weight L-Threonine could be stored in a highly viscous form without any problems over a period of three months even at a temperature of −20° C. They were, moreover, still fluid up to a concentration of 45% by weight L-Threonine, even under these extreme conditions. Salt solutions of L-Tryptophan with a concentration of 30 (sodium salt) or 55 (potassium salt) % by weight L-amino acid remained stable and pumpable over a period of three months at a storage temperature as low as −5° C. Solutions of a higher concentration in which crystals had formed at, for example, −20° C. or temperatures even lower than this could be rendered soluble again through simple heating of the crystal suspension.

Compared with the crystallized, free amino acids, the great advantage of the aqueous, highly concentrated salt solutions of L-Threonine and L-Tryptophan according to the invention lies in the fact that they can also be accurately metered in relatively small quantities. In an advantageous embodiment the use according to the invention is also characterised in that a quantity of 0.01 to 5.0% by weight soluble L-Tryptophan and/or L-Threonine salts is employed for supplementation purposes. The fluid form of the highly concentrated salt solutions of L-Threonine and L-Tryptophan permits excellent and accurate metering, especially in a particularly preferred quantity range of 0.01 to 0.1% by weight.

The L-Tryptophan and/or L-Threonine salt solutions which can be used according to the invention are in the simplest case obtained by dissolving the corresponding amino acids in water and adding the equivalent quantity of sodium hydroxide solution or potassium hydroxide solution. When producing L-amino acids on an industrial basis, it is of course simpler and more appropriate to work directly towards aqueous solutions of the salts which contain the L-amino acids in the desired concentration. This naturally simplifies the production process and reduces costs, particularly in comparison with the production of crystallized, free amino acids.

The invention shall be illustrated by the following examples:

EXAMPLE 1

1 Equivalent amino acid and 1 Equivalent sodium hydroxide solution or potassium hydroxide solution were dissolved in water at 20° C. The following concentrations could be achieved:
70% by weight L-Tryptophan sodium salt≡50% by weight L-Tryptophan;
75% by weight L-Tryptophan potassium salt≡63% by weight L-Tryptophan;
81% by weight L-Threonine sodium salt≡68% by weight L-Threonine.

EXAMPLE 2

Aqueous solutions with:
55% by weight L-Tryptophan sodium salt≡50% by weight L-Tryptophan (viscosity of solution: 440 centipoise (cP) at +5° C., 130 cP at +20° C.);
65% by weight L-Tryptophan potassium salt≡55% by weight L-Tryptophan (viscosity of solution: 840 cP at +5° C., 220 cP at +20° C.);
65% by weight L-Threonine sodium salt≡55% by weight L-Threonine (viscosity of solution: 1940 cP at +5° C., 400 cp at +20° C.);
73% by weight L-Threonine potassium salt =55% by weight L-Threonine (viscosity of solution: 1130 cP at +5° C., 210 cP at +20° C.) exhibited no crystal formation, remained fluid and chemically stable and did not undergo racemization after storage tests over 3 months at +5° C.

EXAMPLE 3

Aqueous solutions with:
65% by weight L-Threonine sodium salt≡55% by weight L-Threonine (viscosity of solution: >2000 cP at −20° C., 400 cP at +20° C.);
73% by weight L-Threonine potassium salt≡55% by weight L-Threonine (viscosity of solution: >2000 cP at −20° C., 210 cP at +20° C.)
exhibited no crystal formation, remained highly viscous and chemically stable and did not undergo racemization after storage tests over 3 months at −20° C.

EXAMPLE 4

Aqueous solutions with:
53% by weight L-Threonine sodium salt≡45% by weight L-Threonine (viscosity of solution: >2000 cP at −20° C., 55 cP at +20° C.)
60% by weight L-Threonine potassium salt≡45% by weight L-Threonine (viscosity of solution: 320 cP at −20° C., 6 cP at +20° C.)
exhibited no crystal formation, remained fluid and chemically stable and did not undergo racemization after storage tests over 3 months at −20° C.

EXAMPLE 5

Aqueous solutions with:
33% by weight L-Tryptophan sodium salt≡30% by weight L-Tryptophan (viscosity of solution: 40 cP at −5° C., 10 cP at +20° C.);
65% by weight L-Tryptophan potassium salt≡55% by weight L-Tryptophan (viscosity of solution: >2000 cP at −5° C., 220 cP at +20° C.)
exhibited no crystal formation, remained fluid, chemically stable and did not undergo racemization after storage tests over 3 months at −5° C.

Further embodiments and advantages of the invention are comprised in the following claims.

What is claimed is:

1. A method for preparing supplemented animal feedstuffs comprising addition of a highly concentrated aueous salt solution containing between 30% and 70% L-threonine to animal feedstuffs.

2. The method according to claim 1, wherein the solution is storage-stable for at least three months at temperatures between −20° and +5° C.

3. The method according to claim 1, wherein the soluble L-threonine salts are present in a quantity of 0.01 to 5.0% by weight.

4. The method according to claim 1, wherein the L-threonine salt is L-threonine sodium or potassium salt, or mixtures thereof.

* * * * *